Figure 1:
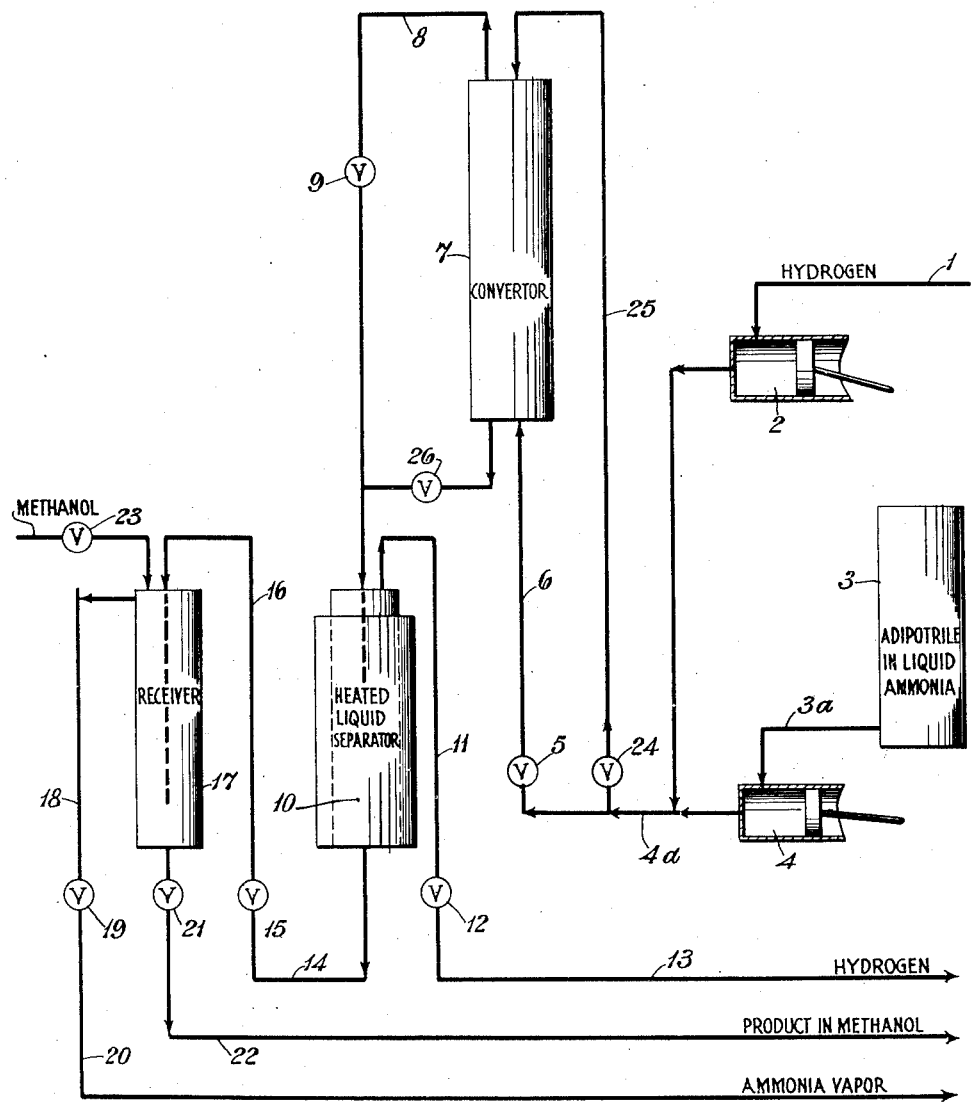
Figure 2:
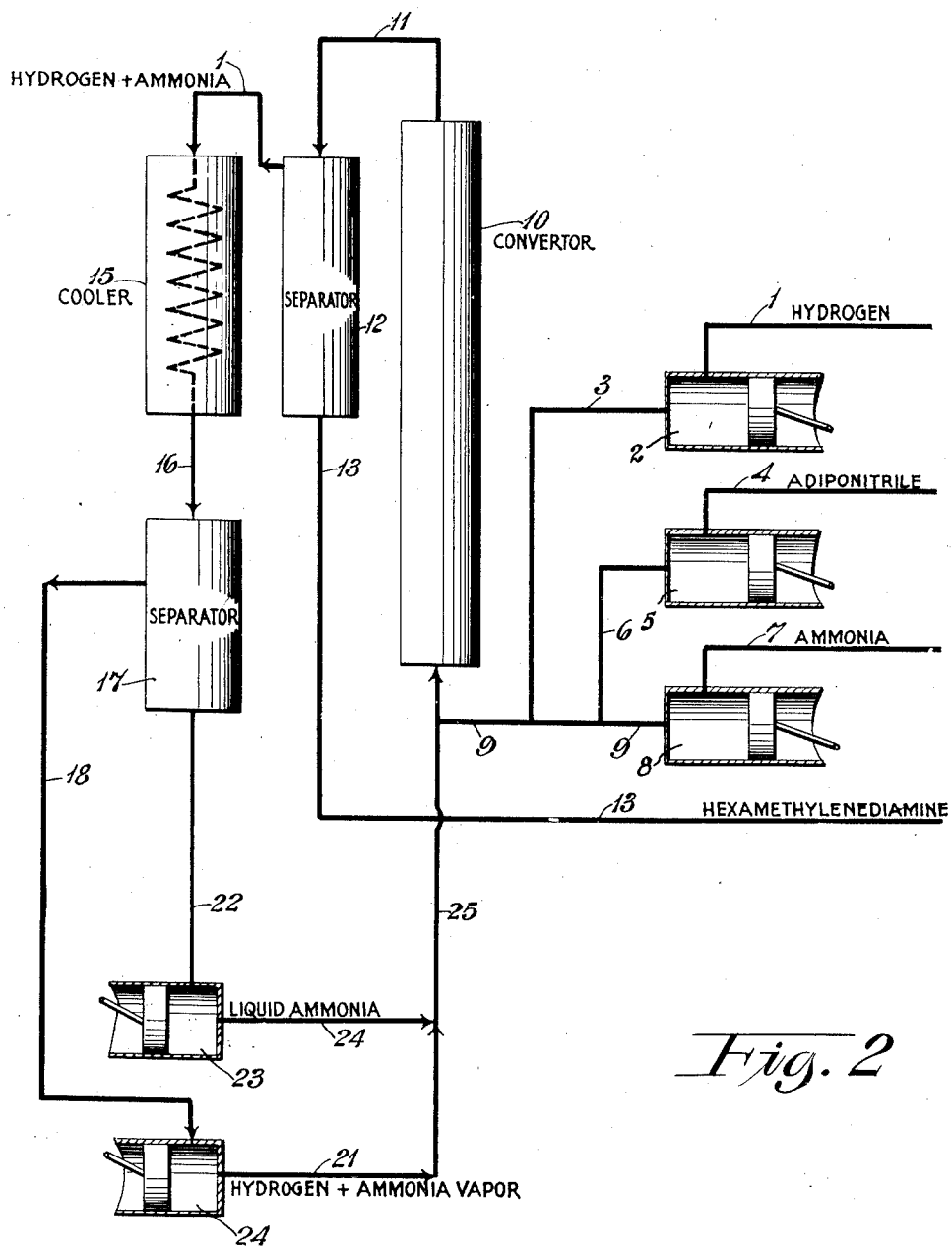

Arthur W. Larchar
Howard S. Young   INVENTORS
BY
George W. Walker   ATTORNEY

Patented May 26, 1942

2,284,525

UNITED STATES PATENT OFFICE 2,284,525

PROCESS FOR THE HYDROGENATION OF ADIPONITRILE

Arthur W. Larchar, Wilmington, Del., and Howard S. Young, Fairville, Pa., assignors to E. I. du Pont de Nemours & Company, Wilmington, Del., a corporation of Delaware Application September 16, 1939, Serial No. 295,180

14 Claims. (Cl. 260—583)

This invention relates to a catalytic process and apparatus, and more particularly to a continuous flow process and apparatus for the catalytic hydrogenation of adiponitrile to hexamethylenediamine.

Catalytic hydrogenation processes have been practiced for many years in the conversion of a wide variety of unsaturated organic compounds into the corresponding saturated derivatives. An outstanding example of this general procedure is found in the hardening of fats which has assumed considerable importance as an industrial process. In general, such contact processes have proved to be more economical and efficient than competitive processes involving the use of chemical reducing agents such as metallic sodium, zinc dust, and iron powder.

The usual method for conducting catalytic hydrogenations comprises suspending a metallic catalyst in a liquid medium containing the material to be hydrogenated and agitating the mixture with hydrogen gas until the required quantity of hydrogen has been absorbed. This batchwise method of hydrogenation has the advantage that sufficient time may be allowed for the process to reach any desired stage of completion. It has the disadvantage that the process is discontinuous and hence more costly than if the equipment could be kept in constant use. Continuous hydrogenation involves so many serious technical difficulties that its use has heretofore been largely restricted to gaseous systems.

This invention has as its object to provide a new and improved continuous flow process for the catalytic hydrogenation of adiponitrile to hexamethylenediamine. Another object is to provide a new and improved process for the catalytic hydrogenation of adiponitrile which obviates the disadvantages inherent to batch or discontinuous processes. A still further object is to provide an apparatus for carrying out the hydrogenation of adiponitrile by a continuous flow process. Other objects will be apparent from a reading of the following description of the invention.

According to the present invention we have found that it is entirely feasible and vastly more economical to carry out the catalytic hydrogenation of adiponitrile in the manner herein described. The process described herein comprises passing adiponitrile and ammonia in the liquid phase while admixed with hydrogen over a hydrogenation catalyst, said reaction being carried out at a temperature between about 100° and about 150° C. and under a total pressure in excess of the vapor pressure of the ammonia.

The drawings are diagrammatical flow sheets showing both the apparatus and process. Figure I shows one modification of the apparatus and process and Figure II shows another modification of the apparatus and process. This invention will be more readily understood by reference to the following specific description thereof. It is to be understood that details familiar to those versed in the art have been omitted, that modifications in constructional details may be made without departing from the spirit of this invention and that we do not wish to be limited to such factors except as may be required by the claims.

Referring more particularly to the drawings designated as Fig. No. 1, hydrogen is supplied to the process from suitable storage through pipe 1, and is compressed to reaction pressure in compressor 2. Pressure storage vessel 3 contains a solution of adiponitrile in liquid ammonia. This solution is delivered to the process via conduit 3A, is brought to the system pressure in pump 4, and is admixed in conduit 4A with hydrogen discharged from compressor 2. The hydrogen and liquid then pass cocurrently up through converter 7 from line 6 and are heated in a preheating zone before the catalyst bed to a temperature 30° to 40° C. below the reaction temperature. The mixture then passes up through the catalyst mass and out of the top of the conversion chamber by way of line 8. An alternative procedure is to flow the reaction mixture downward through the catalyst bed. This is done by closing valves 5 and 9 and opening valves 24 and 26. Up-flow is preferred, however, because there is less danger of channeling in the catalyst space and the time of contact is more easily regulated.

The effluent mixture from the converter passes into a heated, high-pressure, gas-liquid separator 10. Hydrogen containing a few per cent of ammonia vapor is withdrawn continuously from the top of the separator through lines 11 and 13 and valve 12. If desirable, this hydrogen may be returned to the converter by means not indicated in Fig. No. 1. The temperature of separator 10 is so regulated that the hydrogenated products and liquid ammonia collecting there are completely miscible. This product mixture is expanded periodically from the base of separator 10, via line 14, valve 15, and line 16 into methanol in final pressure receiver 17. Methanol is admitted through valve 23. Ammonia vapor is expanded from the top of the final receiver by way of lines 18 and 20 and valve 19. The hydrogenated products dissolved in methanol are discharged from receiver 17 at regular intervals by means of valve 21 and line 22.

The hydrogenation of adiponitrile to hexamethylenediamine is an extremely exothermic reaction which proceeds with the liberation of 70,000 to 80,000 pound centigrade units per pound mol of nitrile reduced. Heat dissipation is, therefore, somewhat of a problem when the reaction is carried out on a large scale. Heat removal may be achieved in a number of ways. For example, an adiabatic system in which most of the heat of reaction is dissipated to a circulating mixture of hydrogen and ammonia has been found to be satisfactory. In such a system, the recycle gas and the liquid ammonia-nitrile mixture pass co-currently through the catalyst bed, entering at about 30° C. below the reaction temperature, and leaving at the reaction temperature. Part of the heat is removed by vaporization of ammonia into the gas phase.

In the process previously described with reference to Fig. No. 1, most of the heat of reaction is accepted by hydrogen and ammonia vapor but means for recycling these materials are not shown. The adiabatic system mentioned above is illustrated diagrammatically in Fig. No. 2.

Referring now to Fig. No. 2, hydrogen, adiponitrile, and ammonia are delivered to the process in conduits 1, 4, and 7, respectively. Compressor 2 and pumps 5 and 8 are employed to bring the materials to reaction pressure. The mixture of adiponitrile and make-up hydrogen and ammonia in line 9 and a recycle fraction from line 25 flow together through the hydrogenating catalyst in converter 10. Here, the nitrile is almost completely reduced to hexamethylenediamine. The temperature of the mixture charged to the converter is adjusted in heat exchange equipment not indicated in Fig. No. 2 to approximately 30° C. below the maximum temperature desired in the converter. The ratio of recycle material to nitrile is regulated so that the temperature of the entire charge will be increased about 30° C. in absorbing the heat liberated by the hydrogenation.

The effluent from the converter is discharged through line 11 into the hot separator 12, where the hydrogenated products are separated from recycle hydrogen and ammonia. The reduction products, together with some ammonia, are discharged from the separator via conduit 13. Make-up ammonia equal to that withdrawn from 12 with the reaction product is replaced through pump 8. Hydrogen and ammonia vapor pass from hot separator 12, via line 14, to cooler 15 and hence to gas-liquid separator 17. Liquid ammonia collecting in 17 is recycled back to the converter by way of lines 22, 24, 25, and pump 23. Hydrogen and ammonia vapor pass from 17 via line 18 to recirculating compressor 20 and are then returned to the converter. As previously mentioned, the temperature of the fresh feed and recycle is adjusted prior to admission to the converter.

*Example I*

A cobalt-copper catalyst was prepared by fusing together a mixture containing 2 parts by weight of cobalt oxide and one part of copper oxide. The fusion mass was crushed and screened to 8 to 14 mesh grains which were thereafter reduced in a hydrogen-carbon dioxide mixture at progressively increased temperatures up to 375° C. until the oxides had been substantially completely reduced to the metals.

This catalyst was maintained at 125° C. in a vertically mounted, pressure resisting, steel vessel which formed part of an equipment assembly similar to that illustrated in Fig. No. 1. A 20.1 wt. per cent solution of adiponitrile in liquid ammonia was withdrawn from a storage tank and pumped upwards through the catalyst together with a co-current flow of hydrogen under high pressure. The incoming charge was preheated to about 95° C. before coming in contact with the catalyst. Adiponitrile and ammonia were fed at rates of 39 and 152 g./hr./100 cc. of catalyst, respectively.

The mixture of hydrogen, ammonia, and reduction products passed from the top of the converter to a high pressure separating chamber which was maintained at 45° C. Hydrogen was withdrawn continuously from the top of this separator at a rate of 45 mols per mol of nitrile charged. A total pressure of 600 to 630 atmospheres was maintained on the reaction system. The hydrogenated products accumulating in the separator in ammonia solution were let down in pressure into a receiver containing methanol. After release of the ammonia and elimination of the solvent methanol, it was found that the conversion of adiponitrile to amino compounds was substantially complete. Over a 160-hour operating period, an average of 91 mols of hexamethylenediamine was recovered per 100 mols of adiponitrile charged.

*Example II*

A cobalt catalyst was prepared by fusing cobalt oxide in a conductance furnace. The fused mass was broken with a jaw crusher, screened to 4 to 18 mesh grains, and reduced in hydrogen for 41 hours at 550° C. The reduced catalyst contained 97% cobalt.

This catalyst was employed to convert adiponitrile to hexamethylenediamine by the procedure previously described under Example I. The catalyst temperature was 123° C., the reaction pressure 600 atmospheres, and the nitrile and ammonia feed rates 44.2 and 175.8 g./hr./100 cc. of catalyst, respectively. The hydrogen flow at the exit of the system was 38.9 mols/mol of nitrile input. The products were vacuum fractionated after removal of ammonia and methanol and were found to contain 80.6 per cent by weight of hexamethylenediamine.

*Example III*

A catalyst was prepared by activating a powdered alloy (50–50 by wt.) of cobalt and aluminum. A suspension of 5400 g. of alloy in 75 l. of water was heated to boiling and a solution of 3240 g. of sodium hydroxide in 20 l. of water was run into the heated suspension over a period of 1.5 hours. The mixture was then boiled for 3.5 hours; the catalyst was washed with water until neutral, dried, and stabilized with air. The resulting finely divided powder, which contained 40% cobalt, was briquetted in $\tfrac{1}{8}''$ tablets. These tablets were used for reducing adiponitrile continuously to hexamethylenediamine by an operation somewhat similar to that described under Example I. In this case, however, the nitrile-ammonia solution and hydrogen were flowed co-currently down through the catalyst bed. The catalyst temperature was 124° C., the system pressure 600 atmospheres, and the nitrile and ammonia feed rates 11.2 and 103 g./hr./100 cc. of catalyst, respectively. The hydrogen flow was 136 mols/mol of nitrile. The product contained 93.8% by weight of hexamethylenediamine.

*Example IV*

A mixture of 595 parts of cobalt oxide and 6 parts of chromium oxide ($Cr_2O_3$) were fused with an oxyhydrogen flame. The fused oxides were crushed, sized, and reduced in hydrogen for 48 hours at 510° C.

This catalyst was used to hydrogenate adiponitrile continuously by following the procedure outlined under Example I. The operating temperature was 124° C., the pressure 610 atmospheres, the nitrile feed rate 43.8 g./hr./100 cc. of catalyst, that of ammonia 174 g./hr./100 cc. of catalyst, and the hydrogen flow 38 mols/mol of nitrile. The hydrogenated product made under these conditions was found to contain 90.3 wt. per cent of hexamethylenediamine.

Although the foregoing examples describe the use of certain definite conditions of temperature, pressure, concentrations of reactants, and the like, it is to be understood that these values may be varied somewhat within the scope of the invention.

The hydrogenation of adiponitrile by the continuous flow method of this invention may be carried out at temperatures from about 100° C. to about 150° C., it being preferable, however, to operate within the range of 110° to 135° C. The pressure used for carrying out the reaction should be sufficient to maintain ammonia in the liquid phase. It is preferable, however, that the total pressure of the system be maintained between about 600 and about 650 atmospheres. The amount of the ammonia required depends of course on the temperature and other conditions. Enough ammonia should be present to give liquid ammonia under the conditions of operation. In general an amount of ammonia in molecular excess of the adiponitrile is used. The preferred ratio of ammonia to nitrile is approximately 4:1 by weight.

While the examples indicate preference for a co-current upward flow of the reactants through the catalytic zone, the invention is not so limited. The reactants may be passed through the zone in any manner, it merely being required that they be in admixture and in contact with the catalyst for a sufficient length of time to produce the desired reaction.

The space velocity of the nitrile over the catalyst may be varied within wide limits, it being recognized, of course, that the rate should be below that which would cause the conversion of adiponitrile to hexamethylenediamine to fall off so that said conversion becomes negligible. As indicated in the examples, it is preferable to operate with a space velocity of about 40 grams of adiponitrile per hour per 100 cc. of catalyst.

While the reaction may be conducted in the presence of any hydrogenation catalyst, it is preferable that there be employed as catalysts the hydrogenating metals of group VIII and of subgroup B in groups I and II of the periodic table either alone, in admixture, or combined with a difficultly reducible metal oxide. Examples of such catalysts are cobalt, nickel, silver, copper, cobalt-copper, cobalt-silver, cobalt-iron, nickel-copper, cobalt-chromium oxide, copper-silica, cobalt-magnesia, cobalt-alumina, nickel-alumina, cobalt-copper-iron, cobalt-copper-chromium oxide, and the like.

Since in the preferred mode of practicing this invention the catalyst is stationary, it is desirable that the catalyst be in pellet or lump form. These catalysts may be made either by compressing into pellets or briquets catalyst powders, deposition of the catalyst on suitable lump or pellet supports, or by activation, by reduction, or other chemical treatment of metals or metal compounds, e. g., alloys in granular form. The preferred catalysts are those containing cobalt, and of these those consisting of copper and cobalt constitute an especially preferred class. In such mixed catalyst compositions the copper may constitute from 5 to 95 mol per cent of the mixture. The preferred catalyst for use in the practice of this invention, however, is a stationary, active, reduced catalyst, containing 35% copper and 65% cobalt.

It will be apparent from the above description that a fundamental advance in the art of hydrogenating adiponitrile has been made. A degree of success has been obtained by a continuous liquid phase hydrogenation process that has not been enjoyed heretofore in the case of other technically important hydrogenation reactions. The continuous flow processes of this invention are not only valuable from the standpoint of decreasing operating costs in hydrogenation but high yields have been obtained that apparently cannot be had by discontinuous operation.

It is apparent that many widely different embodiments of this invention may be made without departing from the spirit and scope thereof and therefore it is not intended to be limited except as indicated in the appended claims.

We claim:

1. A continuous flow process for catalytically hydrogenating adiponitrile which comprises passing hydrogen with a mixture of liquid adiponitrile and ammonia, in a stream through a reaction zone containing a hydrogenation catalyst, the ammonia to nitrile molar ratio being at least 25.4:1 and the hydrogen to nitrile molar ratio being at least 38:1.

2. A continuous flow process for catalytically hydrogenating adipontitrile which comprises passing hydrogen with a mixture of liquid adiponitrile and ammonia, in a stream through a reaction zone containing a hydrogenation catalyst, said reaction being maintained at a temperature between about 100° C. and about 150° C., the ammonia to nitrile molar ratio being at least 25.4:1 and the hydrogen to nitrile molar ratio being at least 38:1.

3. The process in accordance with claim 2 characterized in that the reaction is carried out at a temperature of about 110° to about 135° C.

4. The process in accordance with claim 2 characterized in that the reaction is carried out under a pressure of about 600 to about 650 atmospheres.

5. The process in accordance with claim 2 characterized in that the hydrogenation catalyst comprises as an essential component a member selected from the group consisting of hydrogenating metals, taken alone and in admixture with each other, and such metals combined with a difficultly reducible metal oxide, said hydrogenating metals being members of group VIII and sub-group B in groups I and II of the periodic table.

6. A continuous flow process for the catalytic hydrogenation of adiponitrile which comprises passing hydrogen with a mixture of liquid adiponitrile and ammonia, in a stream through a reaction zone containing a hydrogenation catalyst, the ammonia to nitrile molar ratio being at least 25.4:1 and the hydrogen to nitrile molar ratio being at least 38:1, said reaction being maintained at a temperature of about 110° C. to about 135° C. and under a pressure of about 600 to about 650 atmospheres.

7. The process in accordance with claim 6 characterized in that the hydrogenation catalyst comprises as an essential component a member selected from the group consisting of hydrogenating metals, taken alone and in admixture with each other, and such metals combined with a difficultly reducible metal oxide, said hydrogenating metals being members of group VIII and sub-group B in groups I and II of the periodic table.

8. The process for the preparation of hexamethylenediamine which comprises creating a mixture of liquid ammonia, liquid adiponitrile, and hydrogen, passing said mixture upwards through a catalytic zone containing a hydrogenation catalyst and maintained at a temperature between 100° and 150° C., the ammonia to nitrile molar ratio being at least 25.4:1 and the hydrogen to nitrile molar ratio being at least 38:1.

9. The process for the preparation of hexamethylenediamine which comprises creating a mixture of liquid ammonia, liquid adiponitrile, and hydrogen, the ammonia to nitrile molar ratio being at least 25.4:1 and the hydrogen to nitrile molar ratio being at least 38:1, passing said mixture upwards as a continuous stream through a catalytic zone containing a hydrogenation catalyst and maintained at a temperature between 100° and 150° C., separating from the products of reaction the hexamethylenediamine and unreacted ammonia and hydrogen, recirculating said unreacted ammonia and hydrogen to the reaction zone in such an amount as to assist in regulating the temperature in said zone.

10. The process in accordance with claim 9 characterized in that the admixture of reactants enters the catalytic hydrogenation zone at a temperature approximately 30° below the reaction temperature.

11. A continuous flow process for catalytically hydrogenating adiponitrile which comprises passing hydrogen with a mixture of liquid adiponitrile and ammonia, in a stream through a reaction zone containing a cobalt-containing catalyst, said reaction being maintained at a temperature between about 100° C. and about 150° C., the ammonia to nitrile molar ratio being at least 25.4:1 and the hydrogen to nitrile molar ratio being at least 38:1.

12. A continuous flow process for catalytically hydrogenating adiponitrile which comprises passing hydrogen with a mixture of liquid adiponitrile and ammonia, in a stream through a reaction zone containing a catalyst consisting of copper and cobalt, said reaction being maintained at a temperature between about 100° C. and about 150° C., the ammonia to nitrile molar ratio being at least 25.4:1 and the hydrogen to nitrile molar ratio being at least 38:1.

13. A continuous flow process for catalytically hydrogenating adiponitrile which comprises passing hydrogen with a mixture of liquid adiponitrile and ammonia, in a stream through a reaction zone containing a catalyst prepared by reduction of a hydrogenating metal oxide, said reaction being maintained at a temperature between about 100° C. and about 150° C., the ammonia to nitrile molar ratio being at least 25.4:1 and the hydrogen to nitrile molar ratio being at least 38:1.

14. A continuous flow process for catalytically hydrogenating adiponitrile which comprises passing hydrogen with a mixture of liquid adiponitrile and ammonia, in a stream through a reaction zone containing a catalyst prepared by activation of an alloy of a hydrogenating metal with aqueous alkali, said reaction being maintained at a temperature between about 100° C. and about 150° C., the ammonia to nitrile molar ratio being at least 25.4:1 and the hydrogen to nitrile molar ratio being at least 38:1.

ARTHUR W. LARCHAR.
HOWARD S. YOUNG.